United States Patent
Rapp et al.

(10) Patent No.: US 6,299,940 B1
(45) Date of Patent: *Oct. 9, 2001

(54) GLASS CERAMIC ARTICLE DECORATED WITH CERAMIC PAINTS AND METHOD FOR PRODUCING THE SAME

(75) Inventors: Susanne Rapp, Ruesselsheim; Holger Sieck, Mainz, both of (DE)

(73) Assignee: Schott Glas, Mainz (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/109,774

(22) Filed: Jul. 2, 1998

(30) Foreign Application Priority Data

Jul. 7, 1997 (DE) .............................. 197 28 881

(51) Int. Cl.$^7$ ....................................... B05D 5/00
(52) U.S. Cl. ................... 427/266; 427/265; 427/269; 427/272; 427/282; 427/372.2
(58) Field of Search .................... 428/210, 195, 428/426, 432, 701, 702; 126/39 F, 39 J; 427/258, 265, 266, 269, 272, 282, 372.2

(56) References Cited

U.S. PATENT DOCUMENTS

| | | | |
|---|---|---|---|
| 5,262,204 | * 11/1993 | Hinz et al. | 427/397.7 |
| 5,324,568 | * 6/1994 | Coninx et al. | 428/195 |
| 5,484,467 | * 1/1996 | Nass et al. | 65/33.4 |
| 5,500,255 | * 3/1996 | Leroux et al. | 427/419.2 |
| 5,716,712 | * 2/1998 | Schonig et al. | 428/428 |

FOREIGN PATENT DOCUMENTS

| | | |
|---|---|---|
| 32 24 349 A1 | 1/1984 | (DE) . |
| 33 20 141 C2 | 7/1986 | (DE) . |
| 35 05 922 C1 | 10/1986 | (DE) . |
| 34 33 880 C2 | 3/1987 | (DE) . |
| 36 00 109 C2 | 1/1988 | (DE) . |
| 40 20 972 C1 | 6/1991 | (DE) . |
| 42 01 286 A1 | 7/1993 | (DE) . |
| 41 29 578 C2 | 12/1994 | (DE) . |
| 44 26 234 C | 3/1996 | (DE) . |
| 44 26 234 C1 | 3/1996 | (DE) . |
| 0 091 776 A2 | 10/1983 | (EP) . |
| 0 131 145 A | 1/1985 | (EP) . |
| 0 220 333 B1 | 3/1990 | (EP) . |
| 0 716 270 A | 6/1996 | (EP) . |
| 0 794 158 A | 9/1997 | (EP) . |

* cited by examiner

*Primary Examiner*—Deborah Jones
*Assistant Examiner*—Stephen Stein
(74) *Attorney, Agent, or Firm*—Michael J. Striker

(57) ABSTRACT

A glass ceramic article is decorated with ceramic paints in a screen printing process in accordance with which two, mutually corresponding grate-shaped structural elements are arranged on the surface of the glass ceramic article to form a closed, full-surface decorative coating so that the surface beneath it is not visible. The first structural element consists of ceramic paint members covering respective separate parts of the surface with intermediate spaces between them, while the second grate-shaped structural element consists of other ceramic paint members covering the intermediate spaces between the ceramic paint members of the first structural element but only at most overlapping edges of the ceramic paint members of the first structural element without covering them. The closed full-surface decorative coating can have a two-color pattern, such as a black and white pattern.

4 Claims, 3 Drawing Sheets

GLASS CERAMIC ARTICLE DECORATED WITH CERAMIC PAINTS AND METHOD FOR PRODUCING THE SAME

BACKGROUND OF THE INVENTION

The present invention relates to a glass ceramic article which is decorated with ceramic paints in a screen printing process, as well as to a method of producing the same.

Glass ceramic articles have many applications, for example for temperature-fluctuation resistant (fireproof) kitchen utensils, and in particular as cooking surfaces for kitchen ranges. These articles are generally provided with decorative designs, either for purely aesthetic purpose or for example for marking cooking surfaces at the cooking locations. Ceramic paints based on enamels are used as paints for these decorative designs. They are applied by conventional techniques, for example by screen printing, and subsequently baked. The steps and glass compositions for decorating, dyeing and glazing of glass ceramics are known for example from the German patent documents DE 42 01 286 A1, DE 36 00 109 C2, DE 35 05 922 C1 and DE 34 33 880 C2.

It is known to produce glass ceramic from a nonceramic glass of a composition such as for example disclosed in the patent document EP 0 220 333 B1 by a thermal treatment in accordance with the predetermined temperature-time program (ceramization). In this process the temperatures can reach up to 1000° C.

Also, cooking surfaces for cooking troughs, for example of glass ceramic or special glass, are provided on their upper side with a decorative design of ceramic paints. On the other hand, this decorative design serves for the cooking zone marking and thereby distinguishing between cold and hot regions on the cooking surface. On the other hand, the decoration of the cooking surface performs also an aesthetic function and enables the device manufacturers, by applying of individual decorative features, to produce independent, different product lines.

Until recently, three variants of the decoration of glass ceramic cooking surfaces with screen printing were possible and are on the market:

1. Single paint monochromatic decoration with suitable ceramic paints in hot and cold region with the use of decorative structures of different surface and coating degrees.
2. Single paint-multi paint decoration with suitable ceramic paints only for functional marking of the cooking surfaces, in particular of the cooking zone limiting, but for example also for the residual heat indication or company logo, wherein the glass ceramic surface remains undecorated both in the heating region and in the cold region in a major part.
3. Multi-paint decorations with suitable ceramic decorative paints, wherein during printing a distance must be maintained between different paints to prevent the overlapping and superimposing of the decorative designs which can lead in practical application to peeling of the decorative layer.

With all cooking surfaces having these decorative designs, in the regions with few decorative designs frequently use traces and finger imprints can be found, which are very conspicuous on the continuously smooth, polished surfaces, in particular in exhibition and sales areas.

With glass ceramic cooking surfaces having a scarce decoration, for example only a cooking zone marking, a residual heat indication and a company logo, it is possible that in individual cases, in particular during use of halogen heating bodies and also in the case of strong illumination from above, such as for example in exhibition areas of kitchen studios, it is well known that under certain conditions the "technique below the cooking surface" is visible for the observer or the user, and its aesthetic perception is distorted.

In order to avoid this undesired effect or at least to reduce it, dispersing light coverings are applied. They comprise a dark paint layer, which is applied to the cooking surface lower side so that an observer cannot see through it.

4. The German document DE 44 26 234 C1 proposes a solution of this problem by a ceramic article, in particular a glass ceramic cooking surface which is decorated with ceramic paints, wherein on the glass ceramic article there is a first pant layer which covers 1–95% of the glass ceramic surface as a base decorative design, and at least a further paint layer which overlaps the first paint layer at least partially.

With a decoration in accordance with the DE 44 26 234 C1 a greater part of the outer surface remains uncoated, and during a long utilization of a cooking surface this leads to used traces in form of scratches, to metal wear of the tops and to surface changes of the glass ceramic substrate by unsuitable cleaning means which aggressively and disturbingly act on the cooking surfaces.

The German patent DE 41 29 578C2 discloses a glass disk decorated with a screen printing method, in which a grate-shaped pattern is produced with a combination of different grates, namely a course grate and a fine grate. This is defined in the claims in connection with a portion of the specification starting from column 2, line 45 to column 3, line 30 and illustrated in the drawings.

The German patent DE 40 20 972 C1 describes a screen printing process for glass disks, in which at least two complementary partial surfaces of the decorative design are applied in at least two successive printing steps. The first partial surface is edge-flush along at least one edge with the corresponding first glass disk edge, while the second partial surface is edge-flush along at least one edge with another edge of the glass disk, and mutually complementary partial surfaces of the decorative design overlap at opposite sides at least by a value of the surface tolerances of the glass disk. This is disclosed in the claims in connection with a portion of the specification in column 2, lines 5 to 61, as well as shown in the drawings.

The European patent document EP 0 091 776 A2 discloses a screen printing process for glass disks as described in a portion from page 4, line 8, to page 5, line 25. On page 16, line 13–18 of this patent document there is a hint that also a multi-paint printing is possible.

In the German publication DE 32 24 349 A1 a screen printing oil which is suitable for ceramic paint is disclosed, which is suitable for producing of fine paint grates and relief-shaped printing on ceramic materials, as disclosed in column 3, paragraph 2. This screen printing oil prevents a running of the paint pastes under pressure and provides a contour-sharp printing, so that an additional and overlapping printing of paints with tri-chromatic four-paint printing is possible, as disclosed on page 2, paragraph 2.

The German patent DE 33 20 141 C2 discloses a reproduction method for producing multi-color printing, in which the paint imprint is produced by a plurality of painted flat elements. The image surface is subdivided into identical partial surfaces and each partial surface is subdivided in the adjoining flat elements. This is defined in the claims in connection with a part of the specification from column 3, lines 7 to column 4, line 44. None of the patent documents discloses however a glass ceramic article, in which the mutually corresponding grate-like structural elements are composed on the one hand of structural elements which are positive, and on the other hand of the intermediate spaces between the positive structural elements which are negative.

SUMMARY OF THE INVENTION

Accordingly, it is an object of the present invention to provide a decorated cooking surface which is improved so that it eliminates its sensitivity to finger imprints, use traces and scratches substantially, and wherein the decorative design also provides efficient protection of the glass ceramic from surface damages.

In addition, it is also an object of the present invention to provide such a decorated cooking surface which makes unnecessary a lower layer for dispersion coating.

It is also a further object of the present invention to provide a color glass ceramic article whose painting is completely independent from the underlying substrate, and the substrate which underlies the paint can not be visible at any point.

These objectives could not be achieved before, since a uniform full-surface printing could not lead to a homogenous, optically defectless surface, and in the case of great interconnected printing surfaces this led to peeling.

In keeping with these objects and with others which will become apparent hereinafter, one feature of present invention resides, briefly stated, in a glass ceramic article in which on its outer surface at least two grate-shaped structural elements which correspond to one another and which provide a closed, full-surface decorative covering of the outer surface of the glass article, are applied as paint coats which are arranged near one another. As a result, the impression of a full-surface printing is produced, and the paint printing of the underlying glass ceramic article is completely eliminated.

In the ideal case the grate-shaped structures, which are applied by screen printing as paint coats one after the other, are located absolutely exactly side-by-side so that actually a closed decorative covering of the upper surface of the glass ceramic articles is provided. In practice, however it happens that the grate-shaped paint structures produced by screen printing are not ideally arranged side-by-side. It is possible that edge superimposing, overlapping and over coating of parts of the grate-shaped structures occurs. However these deviations are such that for the observer, an impression of a closed, full-surface paint coating is produced.

Advantageously, the grate-shaped structural elements are not too coarse, in particular smaller than maximum 2×2 cm, in order to avoid peeling due to different expansion coefficients of the substrate and the decorative design.

In order to minimize this problem of "overprinting" of the paints of the grate-like structure elements, it is proposed in accordance with the present invention in a preferable embodiment to apply the grate-shaped structural elements which correspond to one another as paint coats arranged side-by-side, and to produce the closed full-surface decorative covering which is composed from the individual parts or members (in other words the paint spots or portions) of the grate-shaped structural elements (positive) and from the intermediate spaces between these individual parts or members (negative).

When for example the points are the structural elements (or also the grate positive), then the free spaces between the points are the structural elements which are required for closed, full surface decorative covering (the grate negative). If first such a point grate is printed by screen printing as a color paint coat on the substrate, here a dark glass ceramic article, then color points are produced which cover the substrate. When this grate-shaped "positive" structural element is converted so that a negative of the point grate is produced, the structural elements which correspond to the points are produced in a subsequent screen printing of the paint coat.

When in the screen printing process both the positive of a grate-shaped structural element is used as a paint coat and subsequently correspondingly the negative of the same grate is produced as a second paint coat, then a full surface-closed decorative covering on the upper surface of the glass ceramic article is formed.

The present invention can be used basically for all types of grate-shaped structural elements. The corresponding, grate-shaped structural elements which are applied as paint coats arranged near one another can be composed of different paints with respect to their composition and/or paint imprint or composed of the same paints.

In each particular case it can be determined which paints and which paint compositions are optically advantageous, mutually compatible and are suitable for the corresponding applications. For example, the selection of the decorative paints is substantially influenced by temperature loads applied to the decorated glass ceramic articles during their use.

For glass ceramic cooking surfaces, completely different required profiles as to the decorative paints are needed, depending on the type of the heat source, for example electrical radiation heating, halogen radiator, gas radiation burner, inductive heating, open gas burner and possible combinations of them.

Very advantageously and with relatively low temperature loads the full surface decorative covering of a glass ceramic cooking surface can find its use in particular for inductive heating. In this case the decorated cooking surface is subjected here only to relatively low temperatures, which are caused by heated cooking utensils during the inductive heating on the cooking surface. Here, 280° C. must be hardly reached.

A different situation takes place in the cases of electrical heating or gas radiation burners under the glass ceramic cooking surface. Here the temperature load on the cooking surface and the decorative design amounts to 600° C. and higher.

Many decorative paints are also not compatible with one another, for example since they form in contact with one another certain low-melting compounds, or have tendency to peeling during partial overprinting.

The full surface, closed decorative covering in accordance with the present invention does not mean, however, that such a closed full-surface decorative covering of the outer surface of the glass ceramic article does not have windows or free spaces to form operational regions, such as cooking zones, heat maintaining zones, indicating regions and residual heat indicators and/or letterings, and/or symbols and/or other identifications.

For example it is advantageous when all cooking zones, or cooking zones with predetermined heat sources remain free from any decoration, or for example on the basis of the improved heat transfer in the region of the cooking zone or a heat maintaining zone, only a grate-shaped structural element is applied as a decorative coat and corresponding structural elements in this region are dispensed with.

In accordance with the present invention, in addition to the closed, full-surface decorative covering, further decorations can be provided, such as cooking zone rings arranged in the free spaces.

In accordance with a further feature of the present invention, a further decorative structure can be also arranged over the closed full-surface decorative covering.

The present invention also deals with a method of producing a glass ceramic article which is decorated with ceramic paints, in accordance with which an outer surface of non-ceramic glass is provided with a first grate-shaped structural element applied as a paint coat by screen printing, and subsequently is dried, and then at least one further grate-shaped structural element corresponding to the first one is applied near the paint coat associated with the first structural element by screen printing and dried, wherein the structural elements which correspond to one another together form a closed, full surface decorative covering of the outer surface of the glass ceramic element, and thereafter the ceramic paints are burned during the ceramization of the glass into the glass ceramic at temperatures up to 1000° C.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1A:
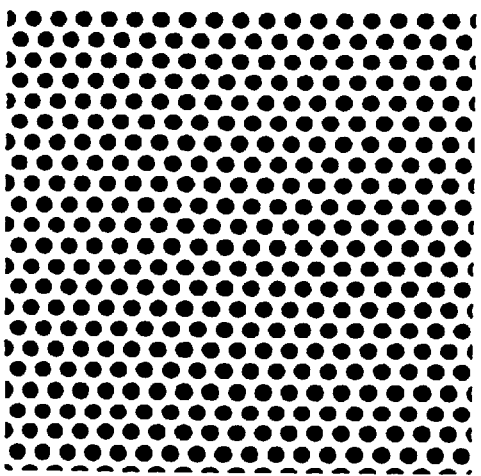
FIG. 1a is a view showing an example of a symmetrical grate with a structural element provided with points as a positive.
Figure 1B:
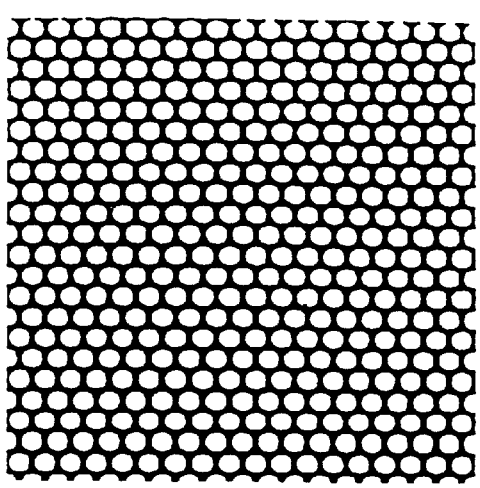
FIG. 1b is a view showing also a symmetrical grate corresponding to FIG. 1 and provided with a structural element corresponding to the structural element with points of FIG. 1 and formed as a negative.
Figure 5:
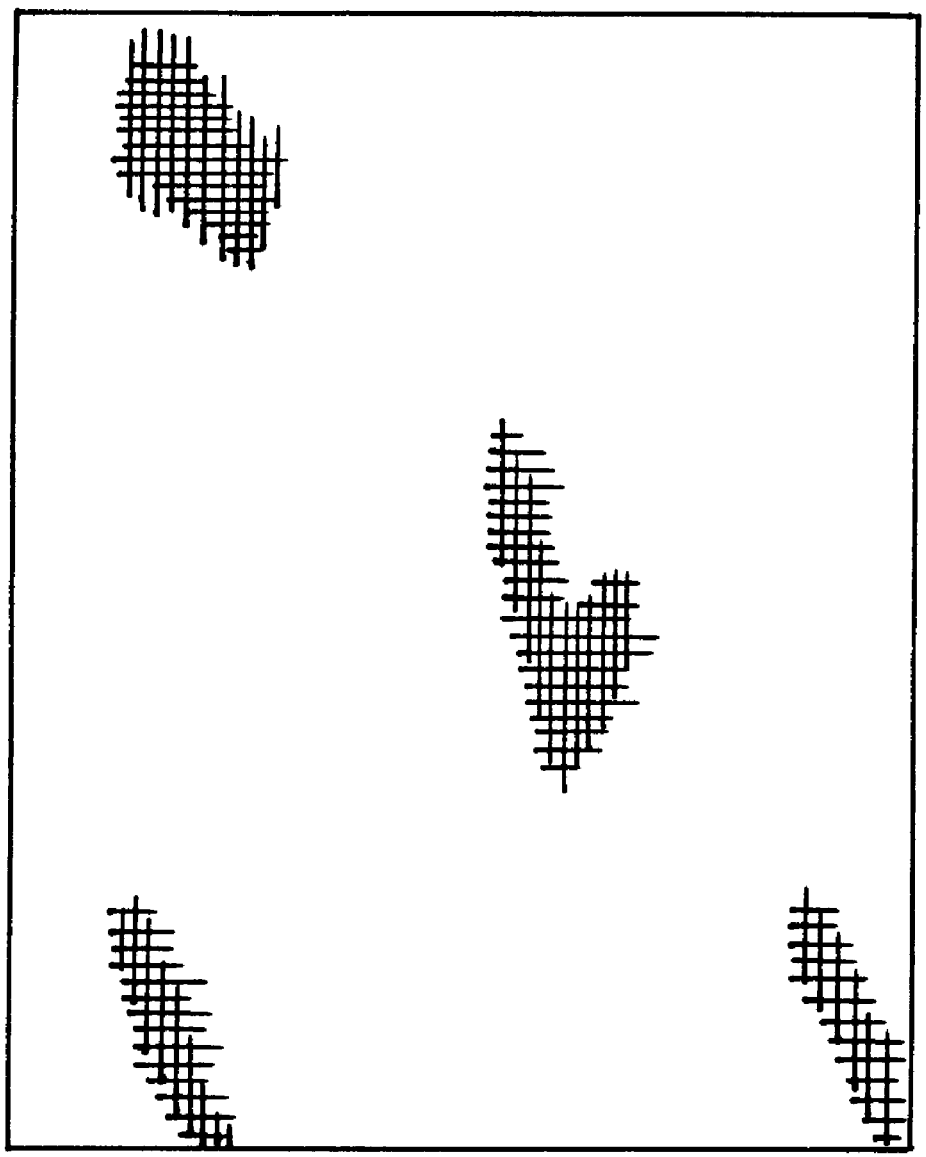
FIG. 5 is a view showing the closed full-surface decorative covering that is formed according to the invention by applying grate-shaped structural element of either FIGS. 1b, 2b, 3b or 4b over the corresponding grate-shaped structural element of FIGS. 1a, 2a, 3a or 4a respectively by screen printing.

FIGS. 1a and 1b illustrate a first example of a glass ceramic article, which is decorated with ceramic paints in a screen printing process. FIG. 1a shows a symmetrical grate-shaped structural element composed of points as a positive and embodied by ceramic paint members, while FIG. 1b shows also a symmetrical grate-shaped structural element corresponding to the grate-shaped structural element of ceramic paint members of FIG. 1a and formed as a negative. The structural elements in FIGS. 1a and 1b are identified by black areas corresponding to ceramic paint members. The grate-shaped structural elements of FIGS. 1a and 1b are printed one after the other and ultimately form a full-surface, closed decorative covering of the substrate, which is here a glass ceramic cooking surface. The resulting full-surface closed decorative covering or coating is shown in FIG. 5.

Figure 2A:
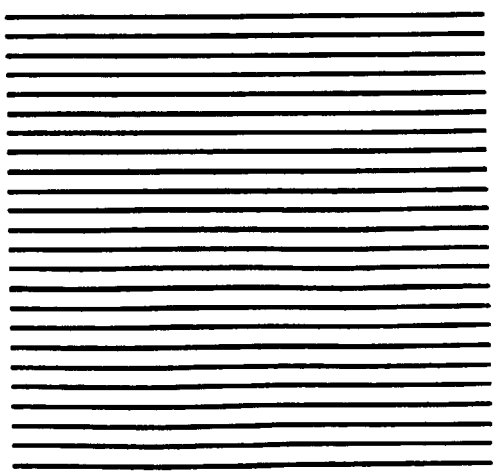
FIG. 2a is a view showing a further example for a symmetrical grate with a structural element formed of lines as a positive.
Figure 2B:
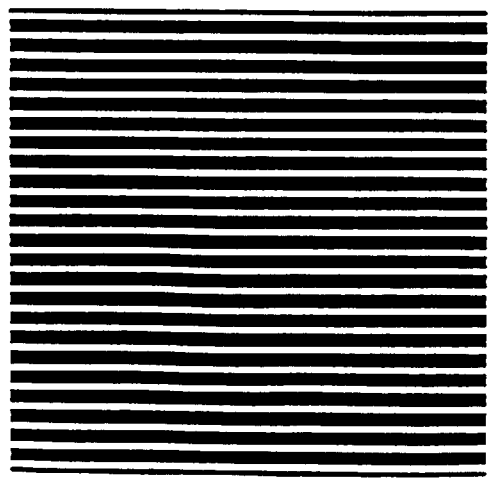
FIG. 2b is a view showing also a symmetrical grate which is associated with FIG. 2a and has a structural element corresponding to the structural element with lines of FIG. 2a and formed as a negative.

A symmetrical grate-shaped structural element shown in FIG. 2a is composed of a pattern of lines made by applying ceramic paint and is thus formed as a positive, while in FIG. 2b a similar symmetrical grate-shaped structural element corresponding to the structural element of lines of FIG. 2a is shown and formed as a negative of it. The structural elements shown in FIGS. 2a and 2b are formed by black paint coats and are printed one after the other so that a full-surface, closed decorative coating on the substrate is formed, wherein the substrate is a glass ceramic cooking surface. The resulting full-surface closed decorative covering or coating is shown in FIG. 5.

Figure 3A:
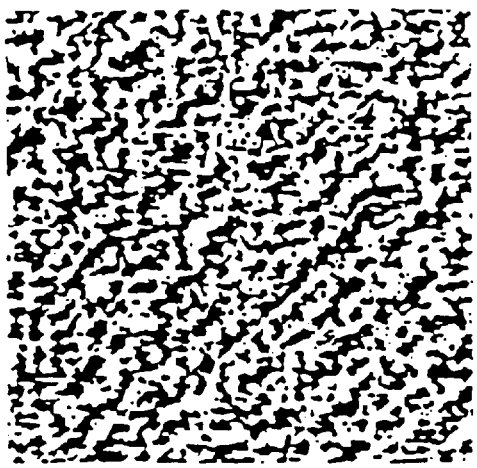
FIG. 3a is a view showing a relatively coarse, asymmetrical grate formed as a positive.
Figure 3B:
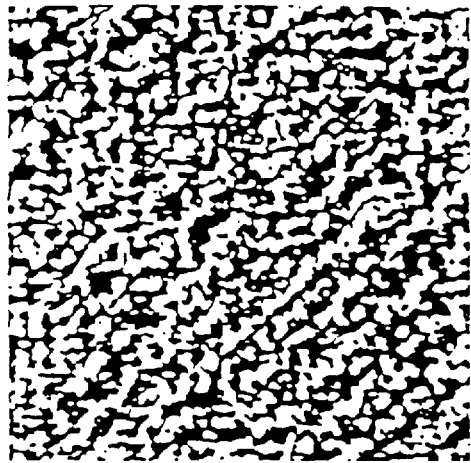
FIG. 3b is a view showing also an asymmetrical grate corresponding to FIG. 3a and including a structural element which corresponds to the structural element of FIG. 3a and is formed as a negative.

FIGS. 3a and 3b show a further modification of the inventive article. FIG. 3a illustrates and example of a relatively coarse, asymmetrical grate-shaped structural element formed as a positive, while FIG. 3b shows also an asymmetrical grate-shaped structural element corresponding to the structural element of FIG. 3a but which is formed as a negative. Similarly, the black structural elements shown in FIGS. 3a and 3b correspond to paint coats, which are printed one after the other and form a closed full-surface decorative covering of the substrate. The resulting full-surface closed decorative covering or coating is shown in FIG. 5.

Figure 4A:
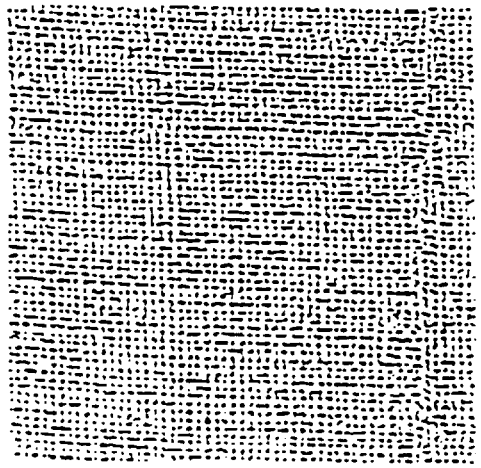
FIG. 4a is a further example of an asymmetrical grate formed as a positive.
Figure 4B:
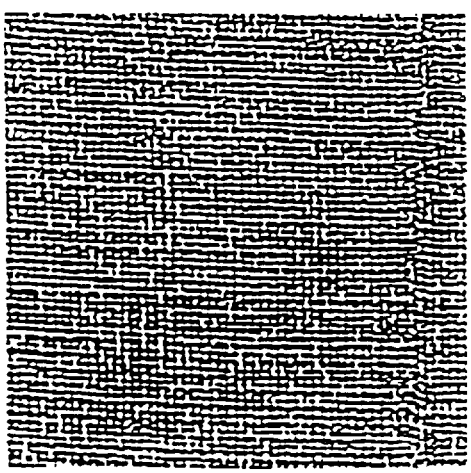
FIG. 4b is a view showing a grate corresponding to FIG. 4a with a structural element which corresponds to the structural element of FIG. 4a and formed as a negative.

Finally, FIG. 4a shows a further symmetrical grate-shaped structural element formed as a positive, while FIG. 4b shows a structural element which corresponds to the structural element of FIG. 4a but which is formed as a negative. Here also, the structural elements correspond to black ceramic paint coats, which are printed one after the other and form a closed full-surface decorative covering of the substrate. The resulting full-surface closed decorative covering or coating is shown in FIG. 5.

In order to produce the inventive article, a screen printing process is utilized, in accordance with which a first grate-like structural element is applied on the glass ceramic cooking surface to be decorated as a paint coat (for example white) and is dried in air or for example at 85° C. for approximately three minutes.

Subsequently in addition to the first white grate-shaped structural element, a further, second grate-shaped structural element which corresponds to the first structural element is printed as a paint coat (here for example black) by screen printing, exactly near one another.

As a result, a full-surface black-white decorative coating is produced. This black-white coating is burnt during ceramization of the glass ceramic.

The ceramic article in accordance with the present invention and the method of producing the ceramic article in accordance with the present invention, in accordance with which a closed, full surface decorative covering on a glass ceramic article is formed, has the following advantageous:

painted glass ceramics can be proposed without the necessity of painting the glass through with extremely high expenses;

the full surface closed decoration which is distributed on the plate protects the glass ceramic from surface cracks, metal wear and use traces;

the decoration reduces also the susceptibility to dirtying, for example finger imprints;

the cooking surface lower sides must not be coated to cover the underlying "technique";

the decoration facilitates the operation of, for example, cooking devices by avoiding confusion of operational region;

the articles are very attractive;

they are produced simply with conventional processes and ceramic paints.

It will be understood that each of the elements described above, or two or more together, may also find a useful application in other types of constructions and methods differing from the types described above.

While the invention has been illustrated and described as embodied in glass ceramic article decorated with ceramic pins, and method for producing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of making a glass ceramic article having a completely closed, full-surface decorative coating, said method comprising the steps of:

a) providing a glass ceramic article body having a surface;

b) applying a first paint coat on said surface of said glass ceramic article body by a screen printing method to form a grate-shaped structural element; and c) applying a second paint coat on said surface of said glass ceramic article body by said screen printing method to form another grate-shaped structural element without completely covering the first paint coat and so that said grate-shaped structural elements of said first paint coat and said second paint coat form the completely closed full-surface decorative coating of said surface and so that said completely closed full-surface decorative coating completely covers said surface so that said surface under said decorative coating is not visible.

2. The method as defined in claim 1, wherein said first paint coat and second paint coat have different compositions.

3. A method of making a glass ceramic article comprising a glass ceramic body and a completely closed, full-surface decorative coating on a surface of said glass ceramic body, said method comprising the steps of:

a) applying a first ceramic paint to said surface of said glass ceramic body by a screen printing method to form a first grate-shaped structural element consisting of first ceramic paint members covering respective separate parts of said surface with corresponding intermediate spaces between said first ceramic paint members;

b) applying a second ceramic paint to said surface of said glass ceramic body by said screen printing method to form a second grate-shaped structural element consisting of respective second ceramic paint members with corresponding intervening spaces between said second ceramic paint members, wherein said second ceramic paint members completely cover said corresponding intermediate spaces between said first ceramic paint members of said first grate-shaped structural element but only at most overlap edges of said first ceramic paint members without completely covering said first ceramic paint members; and then c) baking or burning said glass ceramic body with said first and second grate-shaped structural elements on said surface to form the glass ceramic article with the completely closed full-surface decorative coating so that said surface under the decorative coating is not visible.

4. The method as defined in claim 3, wherein said first ceramic paint has a different composition from that of said second ceramic paint.

* * * * *